US009128919B2

(12) United States Patent
Altman et al.

(10) Patent No.: US 9,128,919 B2
(45) Date of Patent: Sep. 8, 2015

(54) SMART SPACE INSERTION (75) Inventors: Dan Altman, Kirkland, WA (US); David Switzer, Redmond, WA (US); Christopher Michael Shelley, Bellevue, WA (US); Richard Grutzmacher, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1076 days.

(21) Appl. No.: 13/078,234

(22) Filed: Apr. 1, 2011

(65) Prior Publication Data

US 2011/0185277 A1 Jul. 28, 2011

Related U.S. Application Data (63) Continuation of application No. 10/393,933, filed on Mar. 24, 2003, now Pat. No. 7,945,855.

(51) Int. Cl.
G06F 17/00 (2006.01)
G06F 17/24 (2006.01)

(52) U.S. Cl.
CPC .................. *G06F 17/24* (2013.01)

(58) Field of Classification Search
CPC .............. G06F 17/24; G06F 17/2229
USPC ..................... 715/210, 234, 244
See application file for complete search history.

(56) References Cited

U.S. PATENT DOCUMENTS

| 4,723,209 | A | * | 2/1988 | Hernandez et al. | 715/210 |
| 5,745,910 | A | * | 4/1998 | Piersol et al. | 715/210 |
| 5,845,303 | A | * | 12/1998 | Templeman | 715/255 |
| 5,880,740 | A | * | 3/1999 | Halliday et al. | 345/629 |
| 6,690,364 | B1 | * | 2/2004 | Webb | 345/173 |
| 2002/0149630 | A1 | * | 10/2002 | Kitainik et al. | 345/863 |
| 2002/0152240 | A1 | * | 10/2002 | Kitainik et al. | 707/517 |

* cited by examiner

Primary Examiner — Stephen Hong
Assistant Examiner — Marshon Robinson
(74) Attorney, Agent, or Firm — Brian Haslam; Mike Allen; Micky Minhas (57) ABSTRACT A system and method for inserting space is described. A user may designate content to be inserted into a document and have the system insert space to accommodate the new content. The system and method permit some content to overlie other content as may be intended by a user.

20 Claims, 11 Drawing Sheets

| Underlying Content | Content to Insert | | | | | | |
|---|---|---|---|---|---|---|---|
| | | Drawing/ Picture | Text | Text Box | Org Chart | Table | Writing Ink | Drawing Ink |
| None | No Movement | No Movement | No Movement | No Movement | No Movement | No Movement | No Movement |
| Drawing/ Picture | No Movement | No Movement | No Movement | No Movement | No Movement | No Movement | No Movement |
| Text | Insert Space | Insert Space | Insert Space | Insert Space | Insert Space | Insert Space | Insert Space |
| Text Box | Insert Space | Insert Space | Insert Space | Insert Space | Insert Space | Insert Space | Insert Space |
| Org Chart | Insert Space | Insert Space | Insert Space | Reposition Org Chart | Insert Space | Insert Space | No Movement |
| Table | Insert Space | Insert Space | Insert Space | Insert Space | Insert Space | Insert Space | Insert Space |
| Writing Ink | Insert Space | Insert Space | Insert Space | Insert Space | Insert Space | Insert Space | Insert Space |
| Drawing Ink | No Movement | | | | | | No Movement |

SMART SPACE INSERTION

This application is a continuation of U.S. patent application Ser. No. 10/393,933, the entirety of which is incorporated herein by reference.

TECHNICAL FIELD

Aspects of the present intention relates to inserting space. More particularly, aspects of the present invention relate to inserting space into a document or electronic file so as to insert new content.

BACKGROUND

Typical computer systems, especially computer systems using graphical user interface (GUI) systems, such as Microsoft WINDOWS, are optimized for accepting user input from one or more discrete input devices such as a keyboard for entering text, and a pointing device such as a mouse with one or more buttons for driving the user interface.

Some computing systems have expanded the input and interaction systems available to a user by allowing the use of a stylus to input information into the systems. The stylus may take the place of both the keyboard (for data entry) as well as the mouse (for control). Some computing systems receive handwritten electronic information or electronic ink and immediately attempt to convert the electronic ink into text. Other systems permit the electronic ink to remain in the handwritten form.

Conventional word processors provide a simple process for inserting space within a document. For example, a user may repeatedly hit the return key to open up more space within a document. If a user wants to drag and drop information into the word processing document, the user may drop in the content into the document can be readily assured that the content within the document will be moved to accommodate the new content.

However, re-flowing text based on the insertion of new content is not always what the user desires. For example in some cases, a user may be inserting a new image into a document. The user may intend that the new image overlying the existing content. However using the common approach of always inserting new space into a document results in additional work for the user to constantly readjust how new content will be treated upon insertion. Accordingly, a better approach is needed to handle the insertion of new space and/or content.

SUMMARY

Aspects of the present invention address one or more of the issues set forth above, thereby providing an intelligent process for inserting and handling content. In some aspects, the system examines the content to be inserted and determines if it requires existing content to be moved. In other aspects of the present invention, the system examines the content if any at the insertion location and determines if the new content should overlie the existing content or the existing content should be moved to make space for the inclusion of the new content. In yet further aspects of these two examinations of the content may be combined so as to provide any better usability of inserting space within a document. Further, other aspects of the present invention relate to determining the location of an insertion point so as to better providing space where a user expects the space to be placed.

These and other aspects are addressed in relation to the Figures and related description.

BRIEF DESCRIPTION OF DRAWINGS

The foregoing summary of aspects of the invention, as well as the following detailed description of various embodiments, is better understood when read in conjunction with the accompanying drawings, which are included by way of example, and not by way of limitation with regard to the claimed invention.

DETAILED DESCRIPTION OF DRAWINGS

Aspects of the present invention relate to inserting space into documents. The term "document" is used generally herein and includes word processing documents, spreadsheets, images files, presentation files, and the like. The systems and methods described herein relate to using at least one of the present location of an insertion point or previous focus or location of a document on a display to determine where to insert content. Aspects of the present invention may be used with a standard personal computer having a mouse and keyboard. Also, aspects of the present invention may be used with a stylus-based computing system (which may or may not have a mouse (or trackball or touch pad) and a keyboard).

Aspects of the present invention relate to the ability to insert within a document. Further aspects provide the user at the ability to insert among the existing content so as to provide a location in a document for accepting new content. Further, heuristics may be provided that help determine if one desires to insert new content on top of existing content.

Aspects of the present application may be applied to standard computing systems. Further, additional benefit may be achieved in stylus-based computing systems by using aspects of the present invention. For example, if a user desires to input drawing information into a document, the system may examine the content to be inserted (drawing information) and content at the location receiving the new content. If the content at the location is text and the like, the system may insert space so as to permit non-overlap of the existing content with the new content. However, if the existing content is a drawing as well, the user may likely expect to add information to the existing drawing, rather than insert space above it. Accordingly, in this instance, the system may permit the new content to overlie the existing content.

To assist the user, the following is arranged with the following subheadings: characteristics of ink; terms; general-purpose computer; space insertion; and processes for inserting space.

Characteristics of Ink

Electronic ink (or ink) refers to a sequence of strokes, where each stroke is comprised of a sequence of points. The points may be represented using a variety of known techniques including Cartesian coordinates (X, Y), polar coordinates (r, Θ), and other techniques as known in the art.

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve).

To provide the look and feel of physical ink, electronic ink may additionally store ink strokes and properties associated with the ink strokes to more fully render ink. Ink may be stored as a series of strokes and a series of properties. In other situations, ink may be stored with a complex series of properties in which the properties have properties of their own. Properties of the ink may include, for example, color, width, pressure between the stylus and tablet, and angle between the stylus and tablet, and pen shape and the like. While these properties may suffice for many applications, electronic ink is extensible to include custom properties (and other data) generated by additional applications. All strokes and values may be stored directly with excess information. However, alternative versions of ink reflect considerations that eliminate excess information when possible or practicable so as to minimize the physical size of the stored ink.

The properties used to define an ink object and the strokes within the ink object may have varying scope. For example, some properties may apply to all ink strokes in an ink object (e.g., the shape of a pen tip). Other properties may relate only to a specific point (e.g., a point at which a stylus starts a stroke). Others may relate to specific strokes while others may relate to packets of information as reported by hardware (e.g., coordinates, pressure, angle of pen, the intervals of time between reported coordinates, and the like). In short, properties have different levels of scope.

To efficiently store properties, some may be explicitly specified while others may be implicit. In a simple example, all properties may be default properties and not specified in an ink object. So, the ink object may only have X and Y coordinate values. In another example, the ink object may have properties that affect the entire ink object but the properties are specified in the ink object. In a third example, some strokes may have a first set of properties and others have a second set of properties. The properties may be defined initially at the beginning of the ink object and the individual strokes may reference the previously defined properties as needed. Using this approach of defining properties then later referencing the properties promotes a greater efficiency in storing properties. This becomes more apparent as an ink object becomes larger as the number of properties increases and the number of ink strokes referencing the properties increases.

Terms

Ink—A sequence or set of strokes with properties. A sequence of strokes may include strokes in an ordered form. The sequence may be ordered by the time captured or by where the strokes appear on a page. Other orders are possible. A set of strokes may includes sequences of strokes or unordered strokes or any combination thereof Ink object—A data structure storing ink with or without properties.

Stroke—A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points.

Point—Information defining a location in space. For example, the points may be defined relative to a capturing space (for example, points on a digitizer), a virtual ink space (the coordinates in a space into which captured ink is placed), and/or display space (the points or pixels of a display device).

General-Purpose Computer

Figure 1:
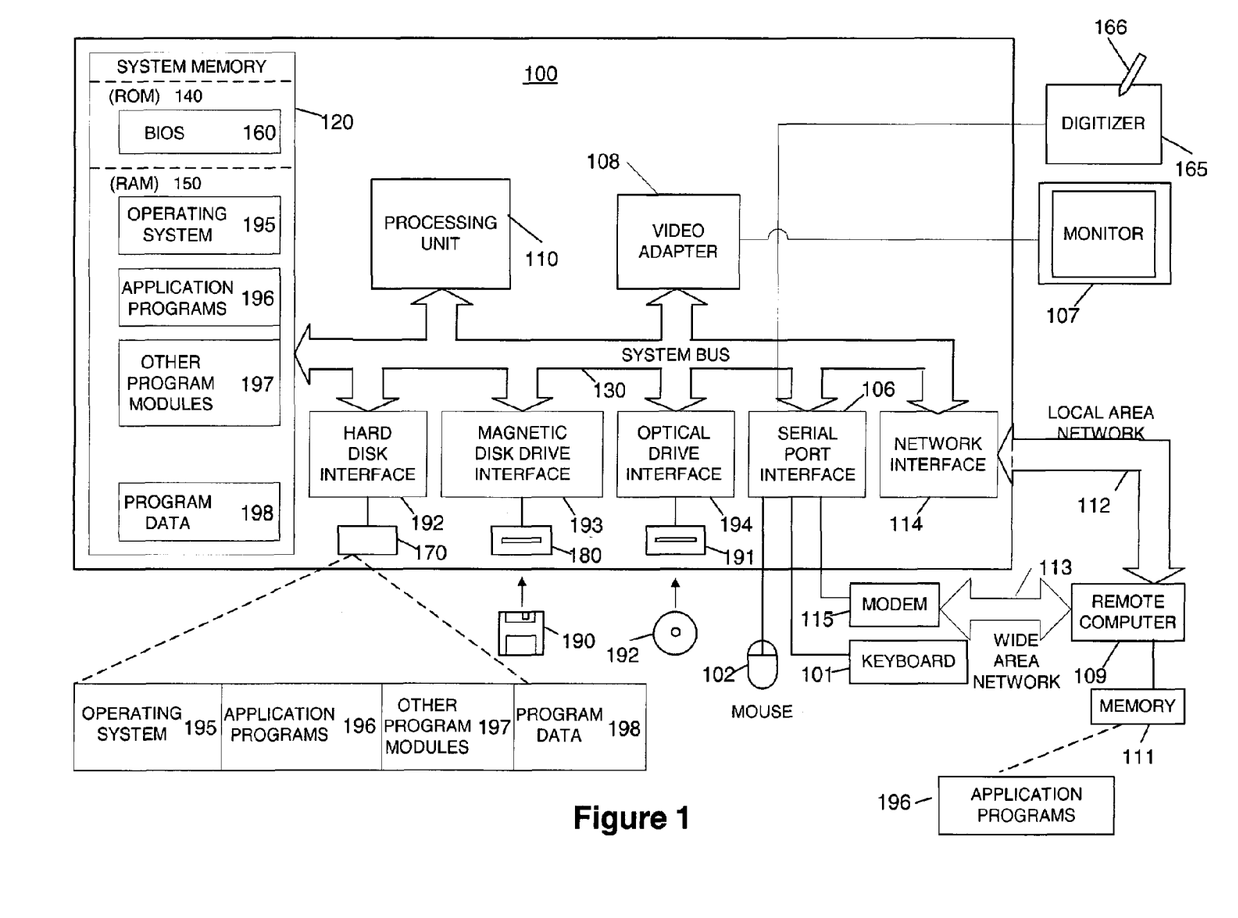
FIG. 1 shows a general-purpose computer supporting one or more aspects of the present invention.

FIG. 1 illustrates a schematic diagram of an illustrative conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a one embodiment, a pen digitizer 165 and accompanying pen or stylus 166 are provided in order to digitally capture freehand input. Although a direct connection between the pen digitizer 165 and the serial port interface 106 is shown, in practice, the pen digitizer 165 may be coupled to the processing unit 110 directly, parallel port or other interface and the system bus 130 as known in the art. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
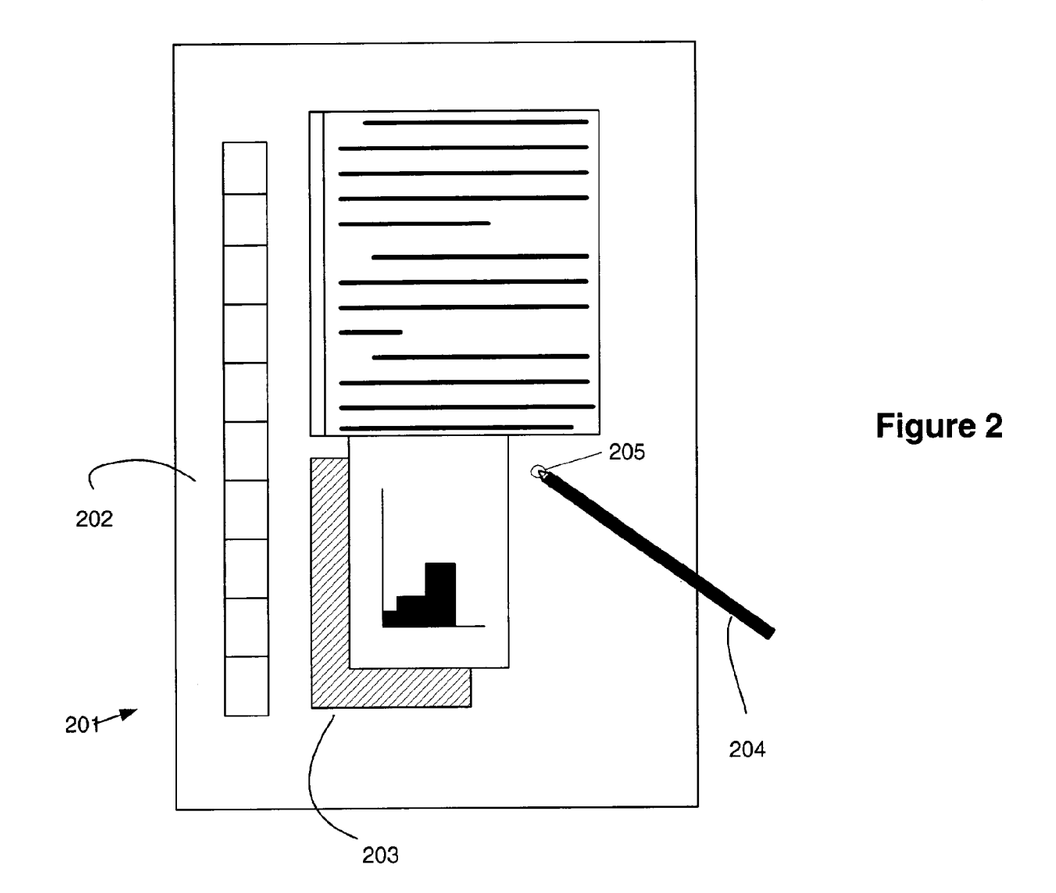
FIG. 2 shows a display for a stylus-based input system according to aspects of the present invention.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electro-magnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Space Insertion

Figure 3:
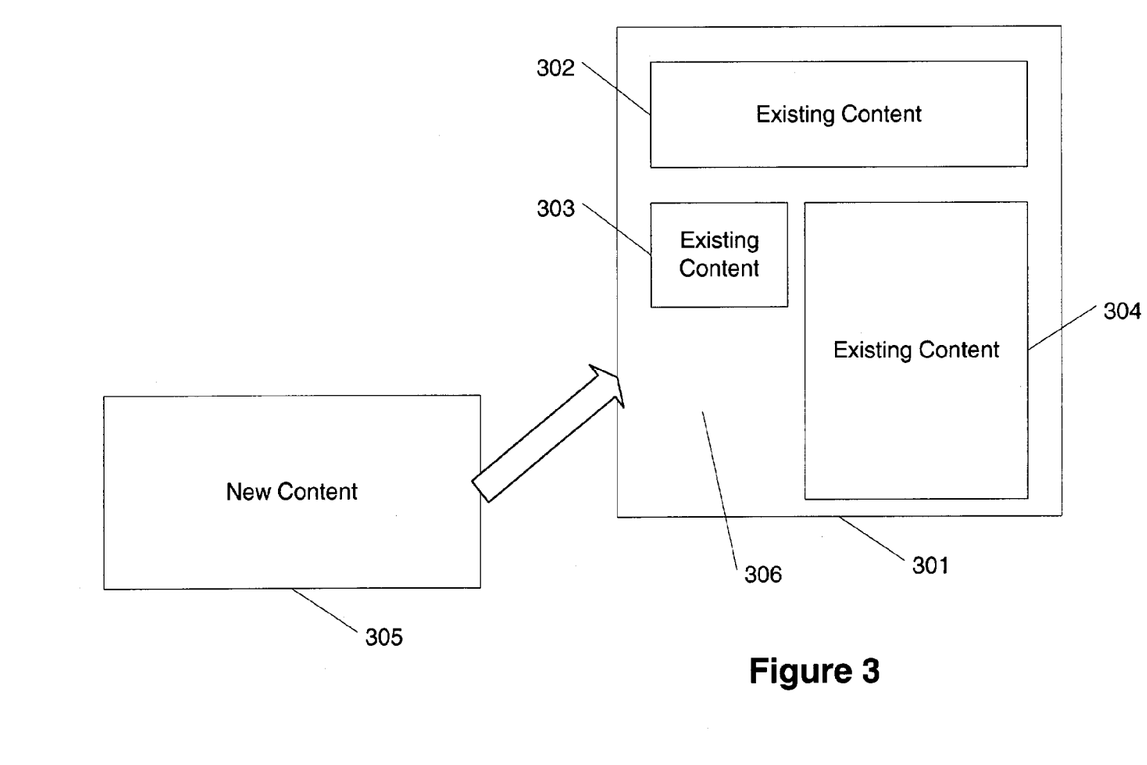
FIG. 3 shows new content being added to a page in accordance with aspects of the present invention.

FIG. 3 shows an example of how page 301 may receive new content 305. Page 301 includes existing content 302,303,304 and blank space 306. Depending on an insertion location on page 301, the various existing content 302-304 and blank space 306 may respond differently to the insertion of new content 305.

Figure 4:
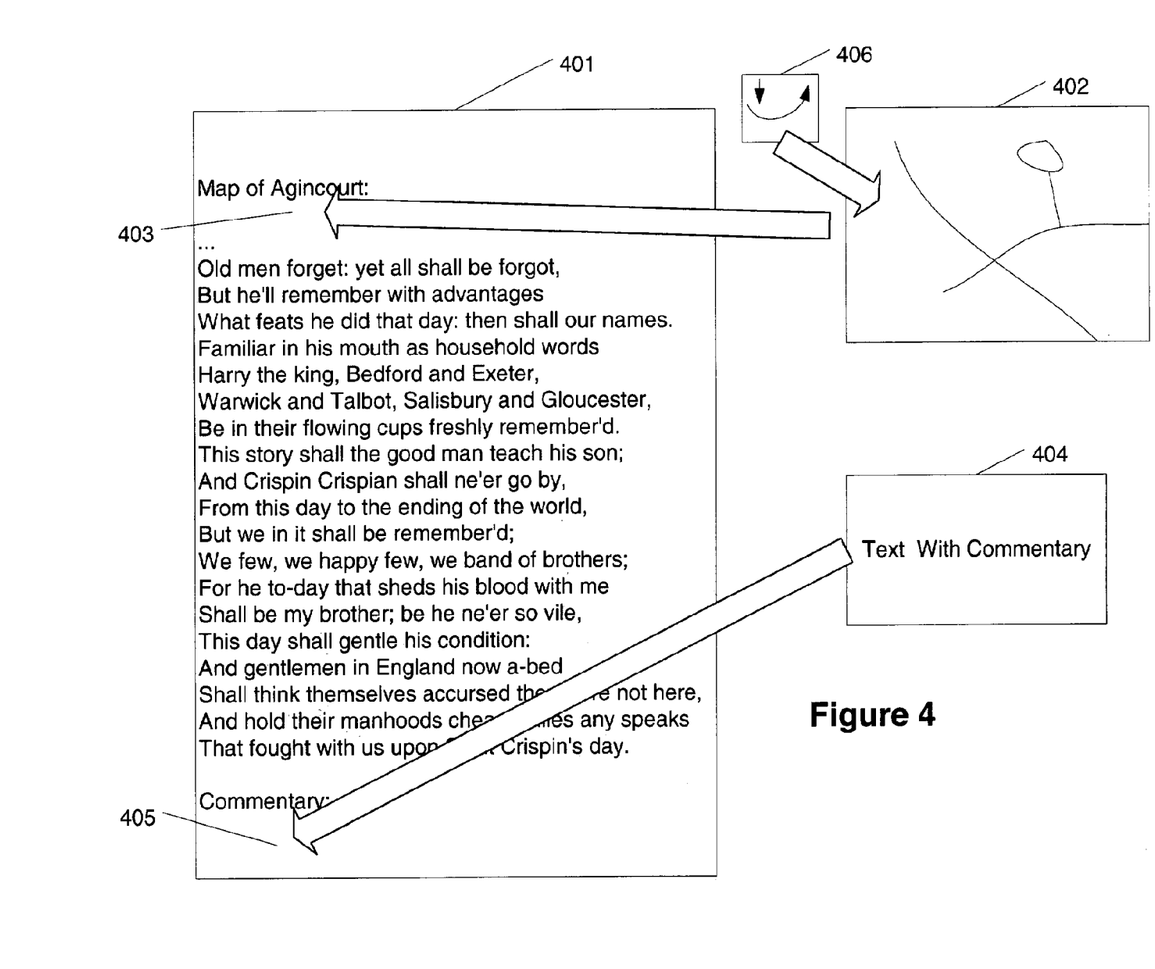
FIG. 4 shows new content being added to a page in accordance with aspects of the present invention.

FIG. 4 shows an example of how content may be added to an existing page of content. Page 401 includes text. Drawing 402 is to be added at location 403. As drawing 402 would block the text on page 401 and that is not likely the user's content, the text on page 401 would have space inserted into it at location 403 to accept drawing 402. Later, drawing 406 may be inserted into drawing 402. As drawing 406 would likely augment the information in drawing 402, space is not inserted into drawing 402 to accommodate new drawing 406. Rather drawing 406 may overlie drawing 402. Next, text 404 may be intended to be inserted at location 405. As it is likely that text 404 is to be read in conjunction with the text on page 401, but not occlude the text on page 401, space may be inserted at location 405 to accept that text 404

Figure 5:
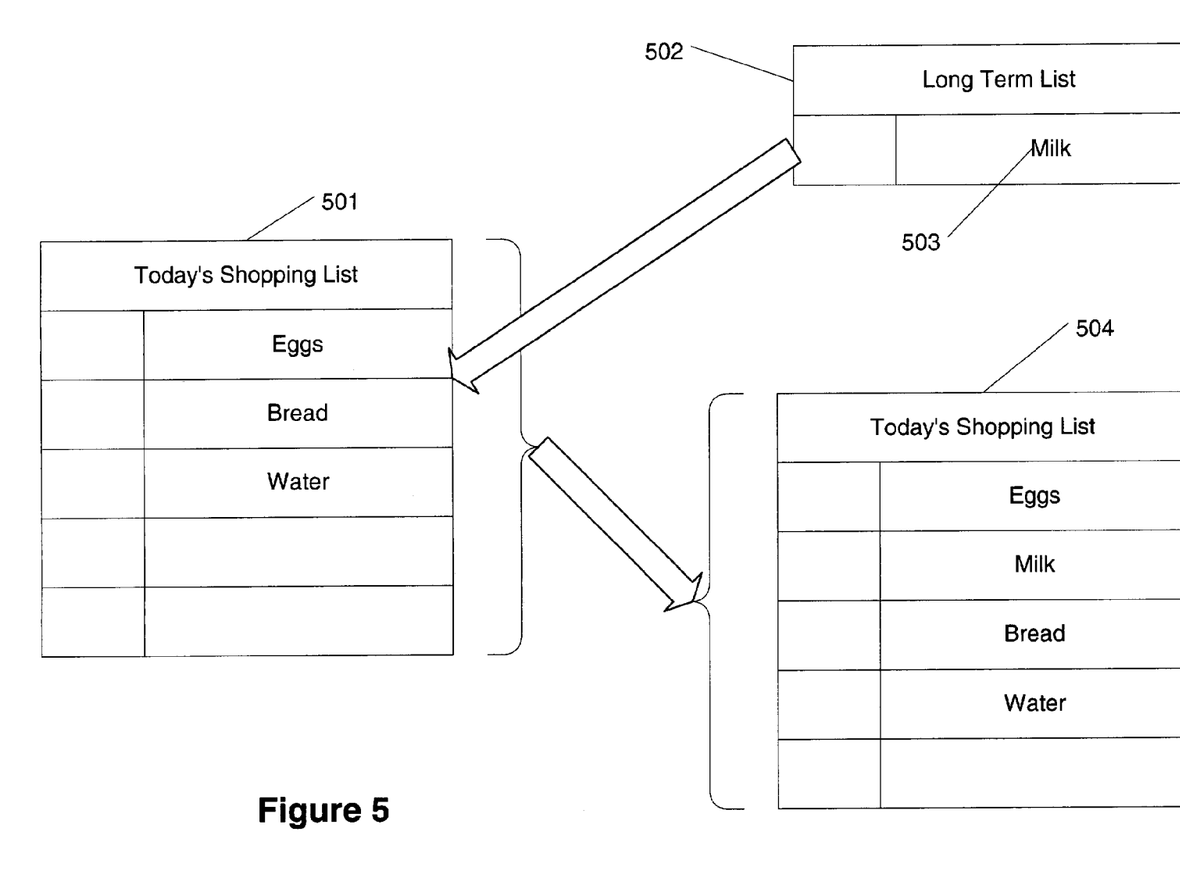
FIG. 5 shows new content being added to a list in accordance with embodiments of the present invention.

FIG. 5 shows an example of inserting an item into a list or a table. List 501 is shown as today's shopping list. Shopping list 501 includes content "eggs", "bread", and "water." Content 502 includes a long term shopping list that includes, among other items, "milk" 503. Here, the user has selected milk 503 and attempted to insert it into shopping list 501. The resultant list 504 is shown as today's shopping list including eggs, milk, bread and water. Here, space was made available between the eggs entry and the bread entry to accommodate milk 503. The example of FIG. 5 shows the invention applied to text on text.

Figure 6:
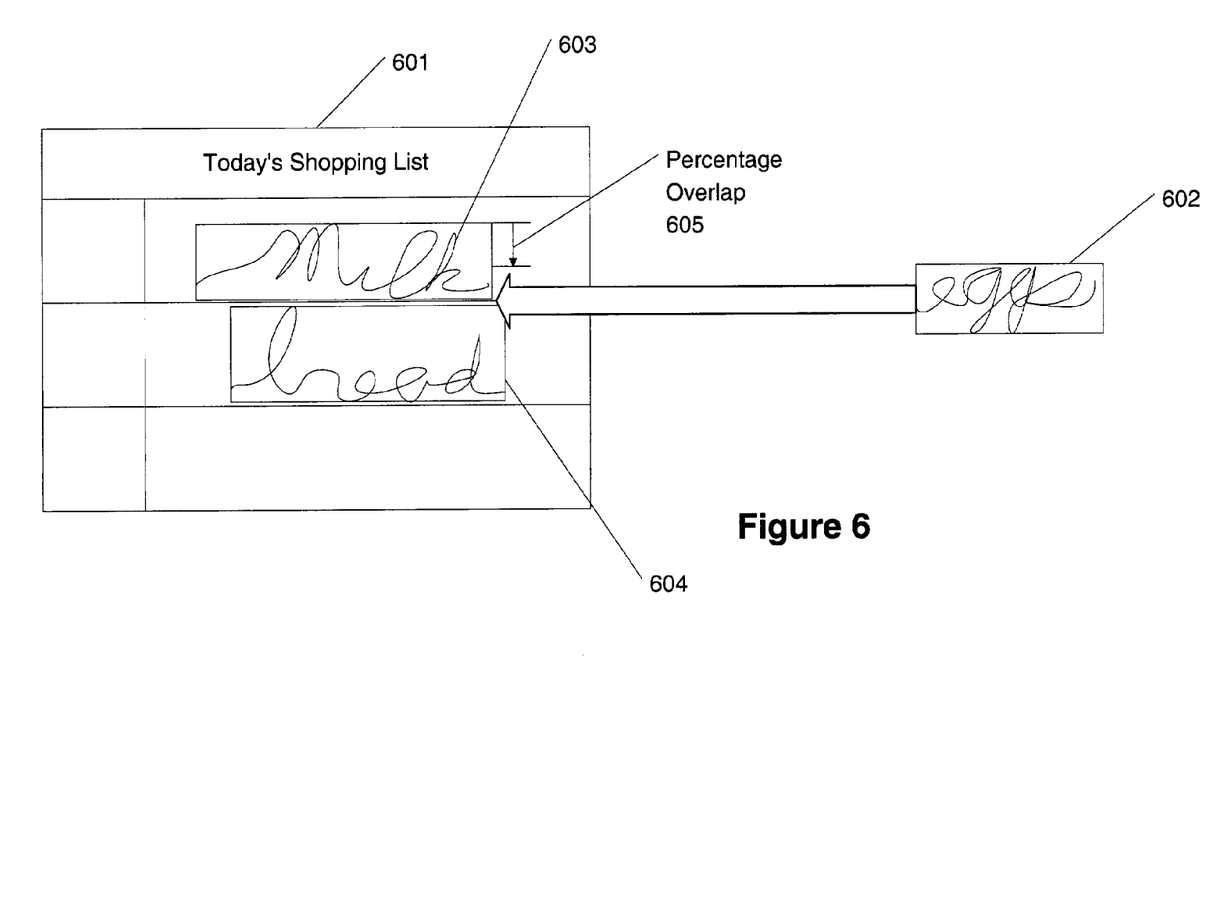
FIGS. 6 and 7 show new content being added to a list in accordance with embodiments of the present invention.

FIG. 6 shows an example of the shopping list using handwritten ink. Shopping list 601 includes entries milk 603 and bread 604. A user is attempting to insert an entry for eggs 602 between milk 603 and bread 604. Because the user's insertion location is somewhere between milk 603 and bread 604, a determination needs to be made of which content of page 603 needs to be moved to accommodate eggs 602.

In this example the bounding boxes surrounding each entry are used. These bounding boxes help determine one ink is selected or the may potentially overlap another ink. Of course, bounding boxes may be used for other non-ink applications as well. In this regard, the invention may be applied to other non-ink applications. Other processes for determining the overlap may be used as well, in conjunction with or in place of bounding boxes. For example, a system may rely on the actual content within the boxes to determine overlap. Further non-rectilinear shapes may also be used to determine intersection.

The system may determine that eggs 602 overlap's both milk 603 and bread 604. The system may deal with this overlap by determining which item, 603 or 604, is closer to the top of the page. Further, the system may determine if eggs 602 overlap's milk 603 by a predetermined amount. In this example of the system determines if eggs 602 overlaps milk 603 by a percentage overlap 605. If the top of eggs 602 is within the percentage overlap 605, then the system may determine that the user in tens that eggs 602 be placed higher than milk 603. In that case, milk 603 and bread 604 may be moved down to provide space for receiving eggs 602.

In one example, the space inserted may be determined by the size of a bounding box or other shape surrounding the content to be inserted. In other examples, the amount of space to be inserted may be determined by the spacing in a list or indent in an outline. Further, movement of content within an existing document may be both up and down and/or maybe left and right as well.

Figure 7:
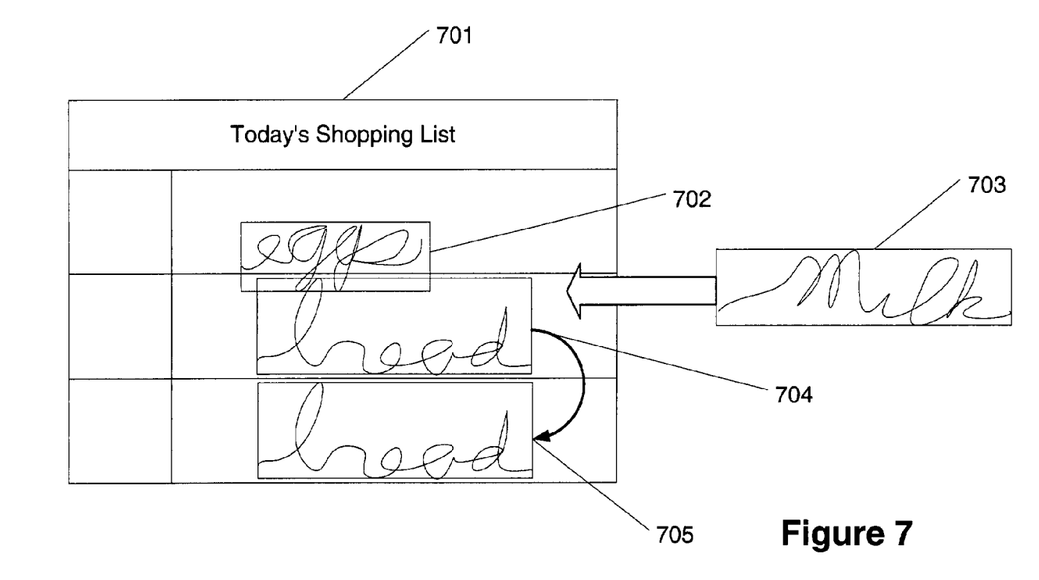

FIG. 7 shows an alternative representation of the shopping list of FIG. 6. Here, shopping list 701 includes eggs 702 and bread 704 and is about to receive milk 703. Eggs 702 is not confined to a single tabular entry within the list of 701. Rather the letters "g" descend below a dividing line between the eggs entry 702 and bread entry 704. Because of this overlap, the system may need to determine if the user's intent. In this example, the user may place milk 703 completely within a tabular region for entry into shopping list 701, where only the bread entry 704 should be moved. However because of the decenders from eggs 702, the entry for milk 703 may overlap eggs 702 by the percentage overlap 605, thereby placing milk 703 above eggs 702, when the user's intent is to place it below eggs 702. Accordingly, the system may have a hierarchical relationship between placement within a structured format of a list as opposed to percentage overlap in terms of determining which content should be moved.

Figure 8A:
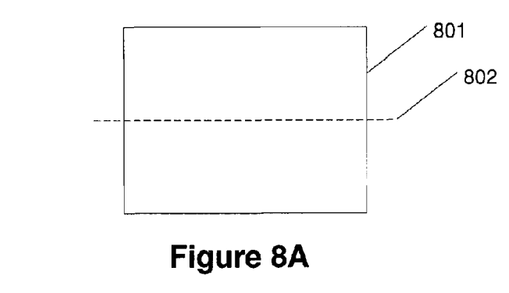
FIGS. 8A and 8B show locations for determining from where new content is to be evaluated in accordance with embodiments of the present invention.
Figure 8B:
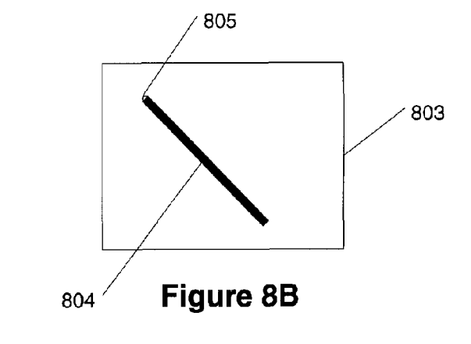

FIGS. 8A and 8B show various ways of designating portions of a document for insertion. In FIG. 8A, content 801 includes a centerline 802. This centerline 802 may be used to determine in which region is the user intends to place content 801. In the FIG. 8b, content 803 includes a location 805 having been designated by stylus 804. This location 805 may be a drag and drop point where a user has picked up content 803 and has dropped it into a document. It is appreciated that any location 805 may be used for determining overlap between content to be inserted and content existing on a page. Further any line (horizontal or vertical or any other direction) may be used to determine if content is to be inserted at one location or another.

Figure 9A:
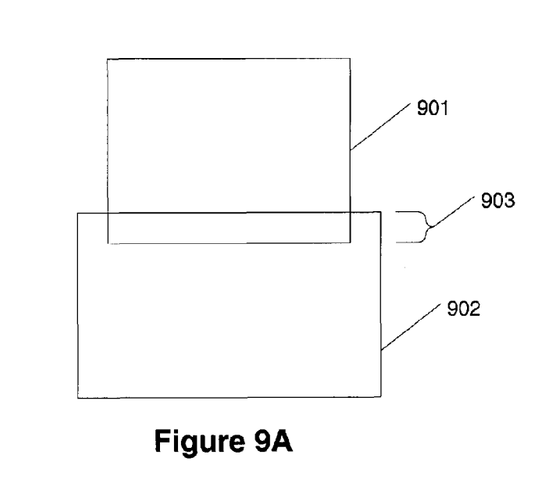
FIGS. 9A and 9B show processes for determining how new content is to be handled in relation to existing content in accordance with embodiments of the present invention.
Figure 9B:
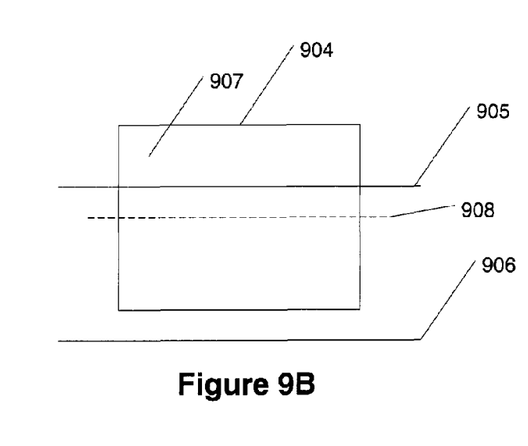

FIGS. 9A and 9B show various aspects of new content and existing content that may be used to determine if space should be inserted and where space should be inserted. In FIG. 9A, existing content 901 and new content 902 overlap by an overlapping portion 903. This overlapping portion 903 may be used to determine if content 902 is intended to be placed higher than content 901 or not. As an example, overlapping portion 903 may be set to 40% as a threshold. If the overlap exceeds 40% (measured from the bottom of the existing content and the top of the new content) (or is less than 60% measured from the top of the existing content and the top of the new content), then the system may determine to move the existing content 901 down and insert space above it for new content 902. Further, these values of 40% and 60% may be adjusted to accommodate different preferences, screen resolutions, mouse movement resolutions, stylus movement resolutions, and the like.

FIG. 9B shows the use of a centerline 908 in which to determine where in a table having lines is new content to be inserted. Here, new content 904 includes centerline 908 placed between two lines of a table 905 and 906. Based on centerline 908 being between lines 905 and 906, the system may determine that content 904 is to be placed between these two lines. However, new content 904 also includes a location 907 that was designated by a stylus (for example, stylus 804). This new location may also help the system determine where content 904 is to be inserted. For example, the fact that location 907 is above line 905 may suggest that content 904 is to be inserted above line 905. This determination may or may not be based on the size of content 904, the distance between point 907 and line 905, and/or some combination of these values.

Figure 10:
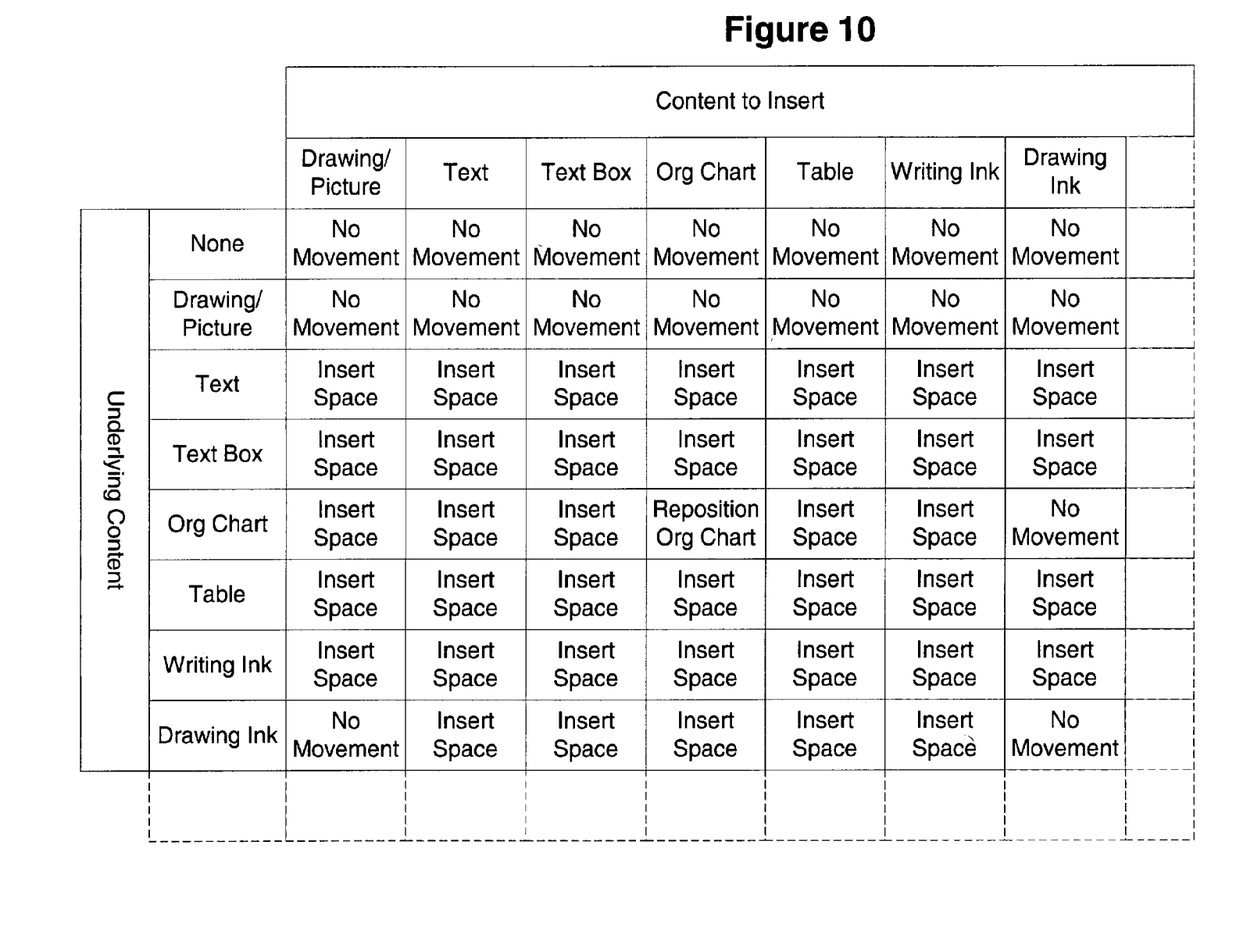
FIG. 10 shows various techniques of handling the new and old content in accordance with embodiments of the present invention.

FIG. 10 shows a relationship between content to be inserted and underlying content and how these content interact. Content to be inserted may include drawings/pictures ink, text, text boxes, organizational charts, tables, and other content. Existing content may include these same contents as well as no content (see, for example, space 306 of FIG. 3). The movement insertion of space and or repositioning of underlying content in FIG. 10 is adjustable. The values given are for illustrative purposes only. They may be changed based on user preferences or developmental tools. For example, a general approach to defining movement or non-movement of content may be as follows. If there is no content on a page receiving content, there is no movement (or possibly expansion of the page) of the page receiving the content. For any content being inserted on top of a drawing or picture, the content is made to overly on or offset from the drawing or picture. If the underlying content is text or a text box or a table or writing ink, space is inserted to provide room for the new content. If the content on a page is an organizational chart, space is inserted except when the new content is an org chart (where the original org chart may be modified or reposition to accept the new org chart) and when the new content is drawing ink (where drawing ink may be applied on top of the org chart). Finally, where the existing content on a page is drawing ink, space may be inserted for all types of new content except when the new content is a drawing or is drawing ink. Alternatively, no movement may be applied in that the action of drawing ink may be made to act like a drawing/picture described and shown higher in the table of FIG. 10. Of course, these actions are illustrative: they may be modified if a developer or user desires an alternate set of actions for content.

A parser may be used to distinguish between drawing ink and writing ink, where the drawing ink is considered to be a drawing and the writing ink is considered to be akin to text or a text box. For example, the parser may look for shapes or may attempt to apply recognition to the ink. Other parsing techniques may be used. Alternatively, a user may identify to the system which type of ink a current ink is (for example, a user may tell a system that the following ink is a drawing or represents text).

Processes for Inserting Space

Figure 11:
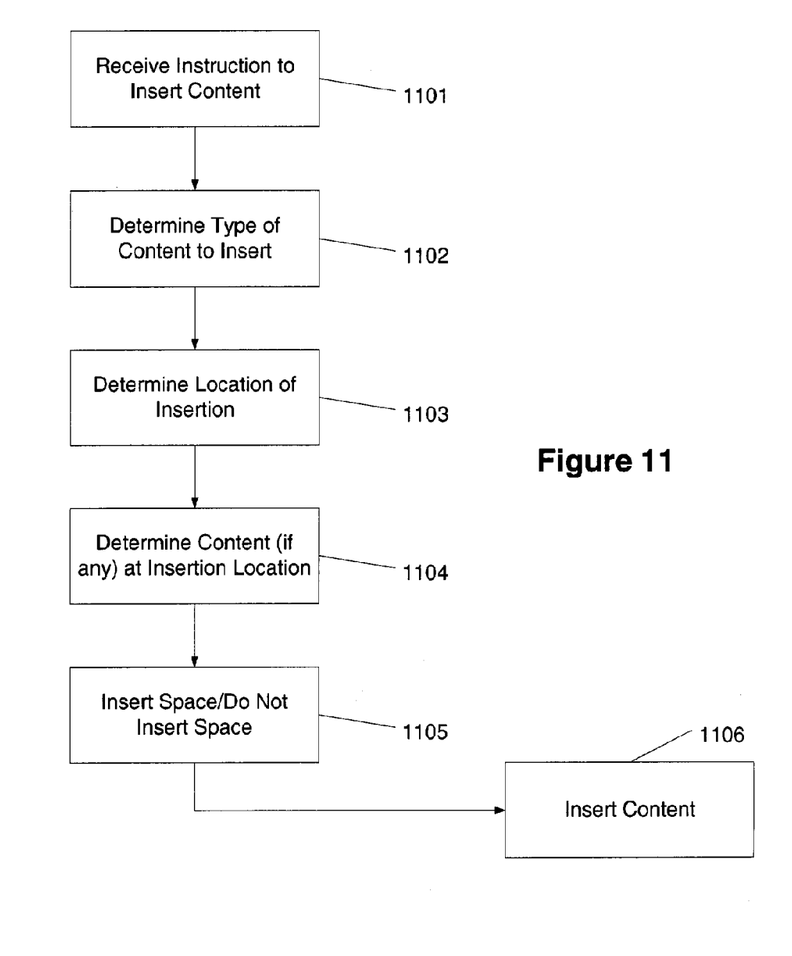
FIGS. 11 and 12 show various processes of handling space insertion in accordance with embodiments of the present invention.

FIG. 11 shows a process for inserting space. In step 1101, the system receives an instruction to insert content. In step 1102, the system determines the type of content to be inserted. In step 1103, the location of insertion is determined. In step 1104, the system examines the content (if any) at the insertion location. In step 1105, space is inserted. Alternatively, based on the determination of steps 1102 and 1104, the system may not insert space at step 1105. In step 1106, content is inserted.

Figure 12:
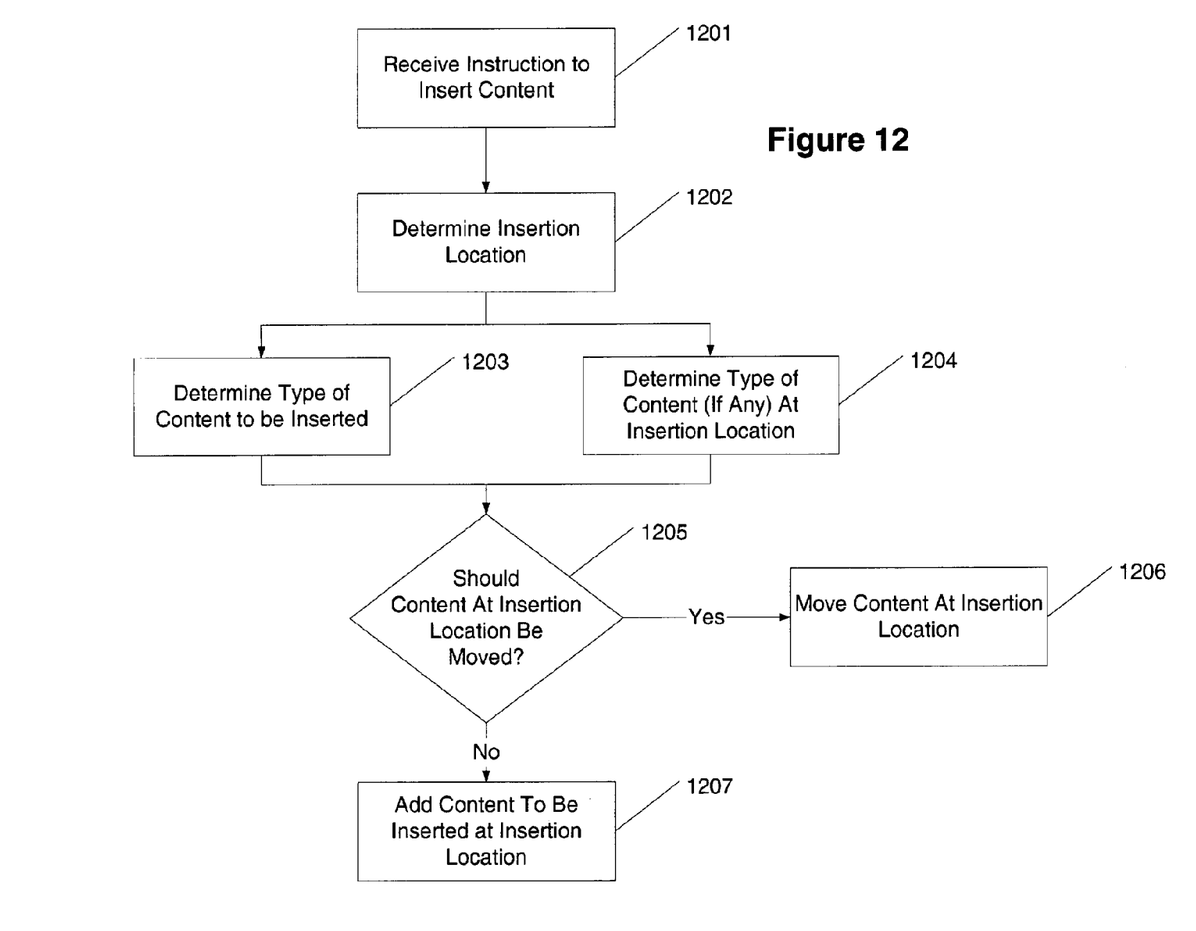

FIG. 12 shows an alternative process for determining whether content should be moved. In step 1201, the system receives an instruction to insert content. In step 1202, the system determines an insertion location for the content. In step 1203, the system determines the type of content to be inserted. In step 1204, the system determines the type of content (if any) at the insertion location. It is appreciated that steps 1203 and 1204 may be performed concurrently or sequentially in any order. Next, in step 1205, the system determines if the content at the insertion location should be moved. For example, the system may check with a table in as set forth in FIG. 10, to determine if content should be moved in relation to new content. If yes from step 1205, the system moves content at the insertion location in step 1206. If no, the system adds the new content at the insertion location in step 1207.

Although the invention has been defined using the appended claims, these claims are illustrative in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

The invention claimed is:

1. A computer-implemented process for inserting space into a document, comprising:
   receiving an instruction to insert new content at an insertion location in a document, the document including a first existing content and a second existing content, the new content being a different type of content than at least one of the first content and the second content;
   determining a bounding shape for the new content;
   determining an amount of overlap between the new content and the first existing content, and an amount of overlap between the new content and the second existing content;
   determining a first content interaction movement specification regarding the overlap between the new content and the first existing content, and a second content interaction movement specification regarding the overlap between the new content and the second existing content;
   inserting, based at least on the determining of the second content interaction movement specification, space at the insertion location by moving the second existing content based on the amount of overlap; and
   inserting, based at least on the determining of the first content interaction movement specification and the determining of the second content interaction movement specification, said new content at the insertion location, the new content overlapping the first existing content by the determined amount while not overlapping the second existing content.

2. The computer-implemented process of claim 1, wherein determining an amount of overlap between the new content and the first existing content, and an amount of overlap between the new content and the second existing content comprises:
   determining a first bounding shape for the first existing content and a second bounding shape for the second existing content;
   determining an amount of overlap between the new content bounding shape and the first existing content bounding shape; and
   determining an amount of overlap between the new content bounding shape and the second existing content bounding shape.

3. The computer-implemented process of claim 1, wherein receiving an instruction to insert new content at an insertion location comprises using a finger to select or indicate a portion of a displayed image on a touch-sensitive or proximity-sensitive screen.

4. The computer-implemented process of claim 1, wherein the first content interaction movement specification is determined based on the content type of the new content, the content type of the first existing content, and a listing of content interaction movement relationships, the listing including at least one user-defined content interaction movement specification.

5. The computer-implemented process of claim 1, wherein the second content interaction movement specification is determined based on the content type of the new content, the content type of the second existing content, and a listing of content interaction movement relationships, the listing including at least one user-defined content interaction movement specification.

6. A computing device for inserting space into a document, comprising:
   an input receiver configured to receive an instruction to insert new content at an insertion location in a document, the document including a first existing content and a second existing content, the new content being a different type of content than at least one of the first content and the second content;
   a parser configured to:
      determine a bounding shape for the new content;
      determine an amount of overlap between the new content and the first existing content, and an amount of overlap between the new content and the second existing content; and
      determining a first content interaction movement specification regarding the overlap between the new content and the first existing content, and a second content interaction movement specification regarding the overlap between the new content and the second existing content; and
   an insertion module configured to:
      based at least on the determining of the second content interaction movement specification, insert space at the insertion location by moving the second existing content based on the amount of overlap; and
      based at least on the determining of the first content interaction movement specification and the determining of the second content interaction movement specification, insert said new content at the insertion location, the new content overlapping the first existing content by the determined amount while not overlapping the second existing content.

7. The computing device of claim 6, wherein the parser configured to determine an amount of overlap between the new content and the first existing content, and an amount of overlap between the new content and the second existing content comprises a parser configured to:
   determine a first bounding shape for the first existing content and a second bounding shape for the second existing content;
   determine an amount of overlap between the new content bounding shape and the first existing content bounding shape; and
   determine an amount of overlap between the new content bounding shape and the second existing content bounding shape.

8. The computing device of claim 6, wherein the input receiver configured to receive an instruction to insert new content at an insertion location comprises an input receiver configured to use a finger to select or indicate a portion of a displayed image on a touch-sensitive or proximity-sensitive screen.

9. The computing device of claim 6, wherein the first content interaction movement specification is determined based on the content type of the new content, the content type of the first existing content, and a listing of content interaction movement relationships, the listing including at least one user-defined content interaction movement specification.

10. The computing device of claim 6, wherein the second content interaction movement specification is determined based on the content type of the new content, the content type of the second existing content, and a listing of content interaction movement relationships, the listing including at least one user-defined content interaction movement specification.

11. The computing device of claim 6, wherein the input receiver comprises a digitizer.

12. The computing device of claim 6, wherein the input receiver comprises a touch-sensitive or proximity-sensitive screen.

13. The computer-implemented process of claim 1, wherein the insertion location is determined by a drag and drop point within said new content.

14. The computing device of claim 6, wherein the insertion location is determined by a drag and drop point within said new content.

15. The computer-implemented process of claim 1, wherein the insertion location is determined by an overlap between said new content and the first existing content.

16. The computing device of claim 6, wherein the insertion location is determined by an overlap between said new content and the first existing content.

17. The computer-implemented process of claim 1, wherein the insertion location is determined by the position of said new content in relation to a structure of a document or item within said document.

18. The computing device of claim 6, wherein the insertion location is determined by the position of said new content in relation to a structure of a document or item within said document.

19. The computer-implemented process of claim 1, wherein said determining steps are performed sequentially.

20. A computer-implemented process for inserting space into a document, comprising:
   receiving an instruction to insert new content at an insertion location in a document, the document including a first existing content and a second existing content, the new content being a different type of content than at least one of the first content and the second content;
   determining a bounding shape for the new content;
   determining an amount of overlap between the new content and the first existing content, and an amount of overlap between the new content and the second existing content;
   determining a first content interaction movement specification regarding the overlap between the new content and the first existing content, and a second content interaction movement specification regarding the overlap between the new content and the second existing content;
   inserting, based at least on the determining of the second content interaction movement specification, space at the insertion location by moving the second existing content based on the amount of overlap; and
   inserting, based at least on the determining of the first content interaction movement specification and the determining of the second content interaction movement specification, said new content at the insertion location, the new content overlapping the first existing content by the determined amount while not overlapping the second existing content,
   wherein the second content interaction movement specification is determined based on the content type of the new content, the content type of the second existing content, and a listing of content interaction movement relationships, the listing including at least one user-defined content interaction movement specification.

* * * * *